Patented Apr. 2, 1940

2,195,440

UNITED STATES PATENT OFFICE 2,195,440

AFTER-CHROMABLE ACID DYESTUFFS OF THE TRIPHENYLMETHANE SERIES

Paul Wolff and Hans Moehrke, Frankfort-on-the-Main-Hochst, Germany, assignors to General Aniline & Film Corporation, a corporation of Delaware No Drawing. Application May 13, 1938, Serial No. 207,790. In Germany June 3, 1937

4 Claims. (Cl. 260—390)

The present invention relates to after-chromable acid dyestuffs of the triphenylmethane series.

We have found that valuable dyestuffs capable of being chromed may be obtained by causing an aromatic monoalkylamine to react with a triphenylmethane-dyestuff carrying at least one group capable of being chromed, i. e. a hydroxy and a carboxy group in ortho-position to each other, and in para-position to the methane carbon atom a halogen atom. The new dyestuffs have a considerably better fastness to alkalies than those obtained from the known chromable dyestuffs of the triphenylmethane series containing in para-position to the methane carbon atom a halogen atom by reaction with a primary aromatic amine.

The following examples serve to illustrate the invention, but they are not intended to limit it thereto:

1. The dyestuff obtainable by condensing 1 mol of 4-chlorobenzaldehyde with 2 mols of 1-hydroxy-5-methylbenzene-2-carboxylic acid (meta-cresotic acid) and subsequent oxidation (cf. example of U. S. Patent No. 1,065,405) is melted for several hours at about 95° C. to 100° C. in the form of its free acid with an excess of ethylaminobenzene in the presence of water until the originally thinly liquid melt has changed to a powder finely suspended in water. The ethylaminobenzene in excess is removed by stirring with dilute hydrochloric acid and a dyestuff is thus obtained which dyes wool, when after-chromed, vivid blue tints. The dyestuff has probably the following constitution:

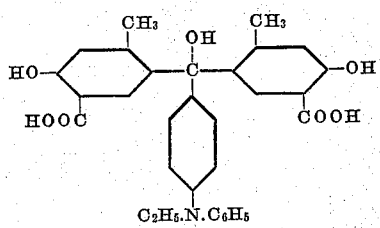

2. By substituting in the process of Example 1 the equivalent amount of 1-methylamino-4-methylbenzene for the ethylaminobenzene used and otherwise proceeding as indicated in that example, a dyestuff is obtained which dies wool, when after-chromed, clear blue tints of a somewhat more greenish shade than that of the dyestuff obtainable as described in Example 1.

3. A dyestuff similar to that obtainable as described in Example 2 may be made by substituting in the process of Example 1 the 1-methylamino-4-methoxybenzene for the ethylaminobenzene used. After removal of the excess of the secondary amine a dyestuff is obtained which dyes wool, when after-chromed, vivid blue tints.

We claim:

1. The compounds of the general formula:

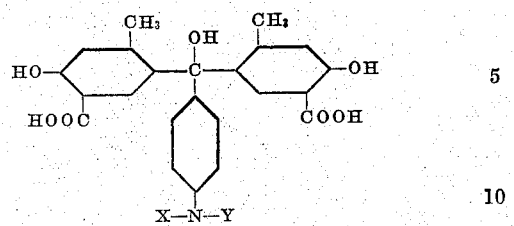

wherein X represents an alkyl of the group consisting of methyl and ethyl and Y represents an aryl group of the phenyl series, said compounds being chromable dyestuffs dyeing wool vivid bluish tints.

2. The compound of the formula:

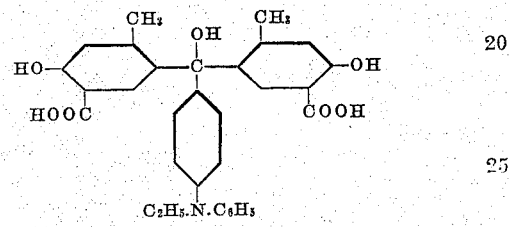

being a dyestuff which dyes wool, when after-chromed, vivid blue tints.

3. The compound of the formula:

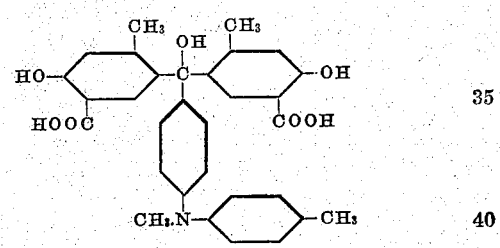

dyeing wool, when after-chromed, clear bluish tints.

4. The compound of the formula:

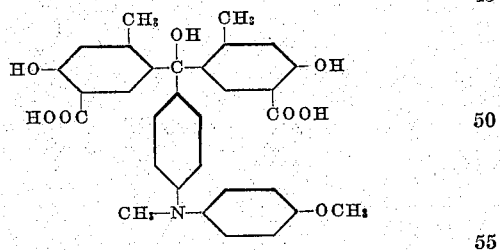

being a dyestuff which dyes wool, when after-chromed, vivid bluish tints.

PAUL WOLFF.
HANS MOEHRKE.